United States Patent [19]
Amezawa et al.

[11] Patent Number: 5,455,967
[45] Date of Patent: Oct. 3, 1995

[54] MOBILE COMMUNICATION SYSTEM AND TRANSMISSION POWER CONTROL METHOD FOR A BASE STATION THEREIN

[75] Inventors: Yasuharu Amezawa; Shinichi Sato; Kohji Takeo, all of Tokyo, Japan

[73] Assignee: Oki Electric Industry Co., Ltd., Tokyo, Japan

[21] Appl. No.: 205,586

[22] Filed: Mar. 3, 1994

[30] Foreign Application Priority Data

Mar. 18, 1993 [JP] Japan ................................ 5-058308

[51] Int. Cl.⁶ ................................................ H04B 7/00
[52] U.S. Cl. .................... 455/69; 455/33.1; 455/54.1; 379/59
[58] Field of Search ............................... 455/53.1, 56.1, 455/33.1, 67.1, 54.1, 54.2, 69, 70; 379/59; 370/18, 95.1, 95.3

[56] References Cited

U.S. PATENT DOCUMENTS

| 4,759,051 | 7/1988 | Han | 455/33.2 |
| 4,777,653 | 10/1988 | Bonnerot et al. | 455/69 |
| 5,241,685 | 8/1993 | Bodin et al. | 455/56.1 |
| 5,333,175 | 7/1994 | Ariyavisitakul et al. | 455/69 |

FOREIGN PATENT DOCUMENTS

| 3441722 | 5/1986 | Germany | 455/33.2 |
| 0111443 | 7/1983 | Japan | 455/33.2 |
| 0104328 | 5/1991 | Japan | 455/33.2 |

OTHER PUBLICATIONS

E. Kudoh; "Effects of Power Control Error on the System User Capacity of DS/CDMA Cellular Mobile Radios"; pp. 524–529; Ieice Trans. Commun., vol. E75–B, No. 6, Jun. 1992.

*Primary Examiner*—Edward F. Urban
*Assistant Examiner*—Doris To
*Attorney, Agent, or Firm*—Frishauf, Holtz, Goodman, Langer & Chick

[57] ABSTRACT

A received power preset value is varied in such a manner that SIR measured at the base station comes to coincide with the target value SIRt. By varying the received power preset value, a cell zone of the base station varies so that the number of mobile stations connected with the base station increases or decreases thereby SIR at each base station approximating with each other. As a result, deviation of communication quality is restricted so that efficiency of the system can be improved.

12 Claims, 5 Drawing Sheets

MOBILE COMMUNICATION SYSTEM AND TRANSMISSION POWER CONTROL METHOD FOR A BASE STATION THEREIN

CROSS REFERENCE TO RELATED APPLICATIONS

This application claims priority right under 35 USC §119 of Japanese Patent Application No. Hei 05-058308, filed Mar. 18, 1993, the entire disclosure of which is incorporated herein by reference.

BACKGROUND OF THE INVENTION

1. Field of the Invention

The present invention relates to a mobile communication system and a transmission power control method for a base station in the mobile communication system, in particular, to those applicable to a Code Division Multiple Access (hereinafter, called as CDMA) communication scheme, effectively.

2. Description of the Related Art

In a mobile communication system, a mobile station is connected with a base station to which a transmission power can be minimized. The base station to which a connection request is issued by the mobile station communicates with the requesting mobile station by controlling its transmission power such that a received power from the mobile station comes to a coincide with that preset by the base station in advance.

On the above described mobile communication system, a reverse link, mobile to base communication, in a mobile communication system based on a CDMA communication scheme will create a near-far problem: received signals from transmitters close to the receiver are strong, while those from far transmitters are weak. Accordingly, a signal to interference power ratio (hereinafter, called as SIR) of a signal received from a mobile station far from the base station becomes small, which leads to degraded communication quality. In order to overcome the above described near-far problem, the transmission power of the mobile station is controlled such that the transmission signal power of the mobile station far from the base station increases whereas that of the mobile station near the base station decreases. This technology has been disclosed, for example, in an article entitled "Effects of Power Control Error on the System User Capacity of DS/CDMA Cellular Mobile Radios" authored by Eisuke Kudo and Tadashi Matsumoto, IEICE TRANS. COMMUN., Vol. E75-B, No. 6, June, 1992. In this article, a technology to solve the near-far problem is disclosed that the transmission signal power of the mobile station which are supervised by each base station is controlled by each base station such that the received signal power of each base station comes to coincide with a predetermined preset value: that is, the received power preset value becomes 1.0. By using the above technique, each base station controls SIR of the signal from the controlled mobile stations to have a constant value. In other words, since all communications in the CDMA scheme are performed within the same frequency band, SIR of the signal from a certain mobile station in the base station can be represented as follows:

$$SIR = P/((M-1) \times P + N) \quad (1)$$

where M is a number of mobile stations connected with the base station; N is a sum of interference noises from mobile stations connected with the other base stations.

As mentioned above, each base station controls SIR from mobile stations to have a constant value. Accordingly, the transmission power control method described in the above article creates a problem that the values of SIR in each base station have deviations with each other when there is a non-uniform user distribution within the radio service area. In particular, assuming that the received power P has a constant value in accordance with the above formula (1), SIR depends on the number M of mobile stations and the interference noise N. Assuming the interference noise N is constant, SIR of the base station depends on the connection number M of mobile stations. In other words, assuming the interference noise N equals to 0; the number M of mobile stations connected with the base station A equals to 101 and the number M of mobile stations connected with the base station B equals to 11, then, SIRA of the base station A equals to 1/100, and SIRB of the base station B equals to 1/10. Accordingly, the more increases the number of connections with the base stations, the less SIR becomes, whereas the less the number of connections, the more SIR becomes.

As described above, if there is a non-uniform user distribution within the radio service area provided by the mobile communication system, the base station which has a dense user distribution of mobile stations reveals smaller SIR, which leads to degraded communication quality.

On the other hand, the base station which has a surplus user distribution of mobile stations reveals larger SIR, which leads to excessive communication quality. Accordingly, a non-uniform user distribution within the radio service area causes deviation of SIR in each base stations, which leads to degraded efficiency of the system as a whole.

SUMMARY OF THE INVENTION

Accordingly, it is a primary object of the present invention to provide a mobile communication system enabling to restrict deviations of communication quality among base stations by varying a received power preset value in each base station of the system so that cell boundary of a service zone area can be varied to adjust the number of mobile stations to be controlled by each base stations.

Another object of the present invention is to provide a transmission power control method for a base station therein to improve an efficiency of the system as a whole in varying a CDMA communication scheme.

To accomplish these objects, there is provided a mobile communication system including a plurality of base stations and mobile stations, the mobile stations being connected and communicated with one of the base stations to which a communication power is least consumed, wherein each of the base stations comprises: (a) a first means for calculating a signal to interference noise power ratio (SIRr) at each of predetermined intervals of time; (b) a second means for calculating a renewal amount ($\Delta P$) by utilizing as function parameters the SIRr and a target value (SIRt); and (c) a third means for renewing a received power preset value for connecting a communication route with the mobile stations in accordance with the renewal amount (AP) so that a cell size of the base station can be changed.

Another aspect of the present invention is provided with a base station in a mobile communication system, which is connected and communicated with mobile stations in a cell zone, the base station comprising: (a) a communication quality processing unit for calculating a signal to interference power ratio (SIRr) at each of predetermined intervals of time in accordance with a received power preset value of the base station and a total received power of the base station; (b) a renewal amount processing unit for calculating a renewal amount (AP) in relation to a formula ΔP=f (SIRt–SIRr)

in accordance with an input target value (SIRt) and the signal to interference power ratio (SIRr), where f(x) is an increasing function passing through a predetermined origin of coordinates; (c) a received power preset value renewal processing unit for renewing a received power preset value S(i) in relation to a formula S(i+1)=S(i)+ΔP in accordance with a received power preset value S(i) of the base station at a just preceding time and the renewal amount (ΔP); and (d) a transmission power control unit for transmitting a transmission power control command to mobile stations supervised by the base station so that a received power of the base station comes to coincide with the received power preset value S(i+1).

Still another aspect of the present invention is provided with a transmission power control method for a mobile communication system comprising the steps of: (a) calculating a signal to interference power ratio (SIRr) at each of predetermined intervals of time in accordance with a received power preset value of the base station and a total received power of the base station; (b) calculating a renewal amount (AP) in relation to a formula ΔP=f (SIRt–SIRr)

in accordance with an input target value (SIRt) and the signal to interference power ratio (SIRr), where f(x) is an increasing function passing through a predetermined origin of coordinates; (c) renewing a received power preset value S(i) in relation to a formula S(i+1)=S(i)+ΔP in accordance with a received power preset value S(i) of the base station at a just preceding time and the renewal amount (ΔP); and (d) transmitting a transmission power control command to mobile stations supervised by the base station so that a received power of the base station comes to coincide with the received power preset value S(i+1).

BRIEF DESCRIPTION OF THE DRAWINGS

By way of example and to make the description more clear, reference is made to the accompanying drawings in which.

DETAILED DESCRIPTION OF THE PREFERRED EMBODIMENTS

Figure 1A:
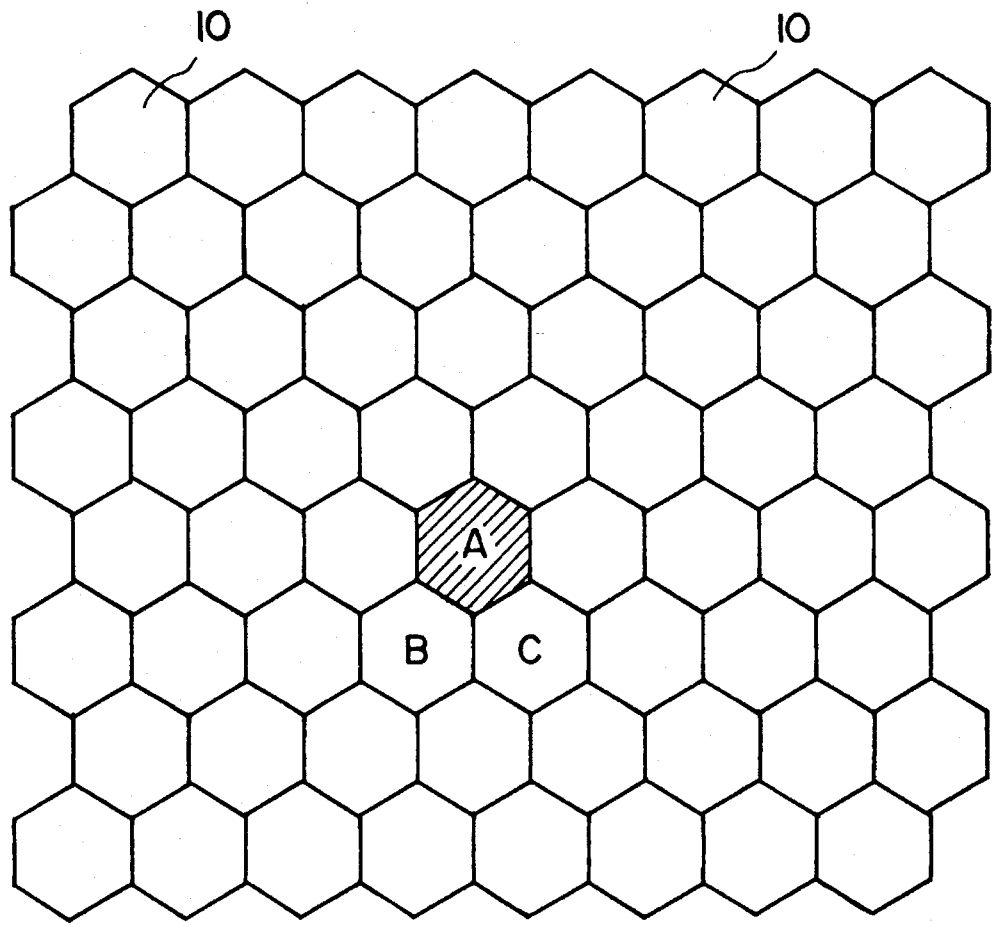
FIGS. 1a–c are hexagonal cell layouts illustrating an example in which a mobile telecommunication system according to the present invention is applied to a CDMA communication scheme.

Referring now to the drawings, a transmission power control method in CDMA communication scheme, a mobile communication system and a base station utilized in the above system will be described in detail.

Figures 1B, 1C:
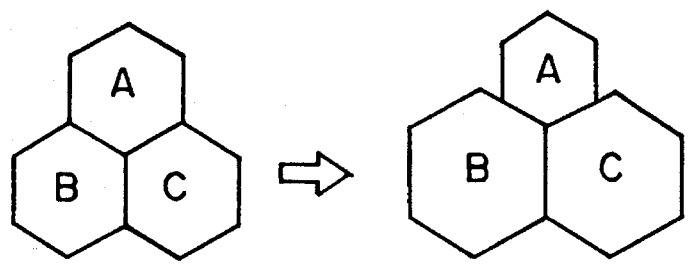

FIG. 1 shows a hexagonal cell layout utilized in mobile communication system to which CDMA communication scheme according to the present invention is applied wherein a plurality of hexagonal shaped cells 10 of each base station are laid out and expanded in two directions. For example, when the number of mobile stations with which each base station is connected is uniformly distributed within a service area, the received power preset values of each base station are substantially equal with each other. Accordingly, as shown in FIG. 1a, the size of the cell 10 in each base station equal with each other. To facilitate understanding of the embodiment according to the present invention, base stations in A, B and C as shown in FIG. 1a are separately depicted as FIG. 1b. When the numbers of mobile stations with which respective base stations A, B and C are connected are substantially equal with each other, the sizes of cells of each base station, as shown in FIG. 1b, are substantially equals with each other, subject to ignore the sum of interferences from mobile stations which connect to the other base stations.

However, when time passes and a portion of the mobile stations which were connected with both base stations B and C moves and enters into a cell of the base station A, the connection number of the base station A with mobile stations increases in comparison with that of the base stations B and C. As a result, when SIR of the base station A becomes small, the cell size of the base station A becomes small, as shown in FIG. 1c, by increasing the preset value of the received power of the base station A. On the other hand, the base stations B and C decrease the received power preset values in order to enlarge the size of the cells due to respective SIRs being large. In this embodiment, the transmission power control of the base station is performed in response to the value of SIR so that deviation of communication quality is well controlled, thereby improving efficiency of the system.

Although FIG. 1c shows a change of the size of cells depending on SIR, it only illustrates an imaginary concept in order to facilitate understanding of the present invention. In other words, when deviation occurs to SIRs among base stations, not only the size of cells but also the shape of the cells may change due to the variation of the received power preset value.

Figure 2:
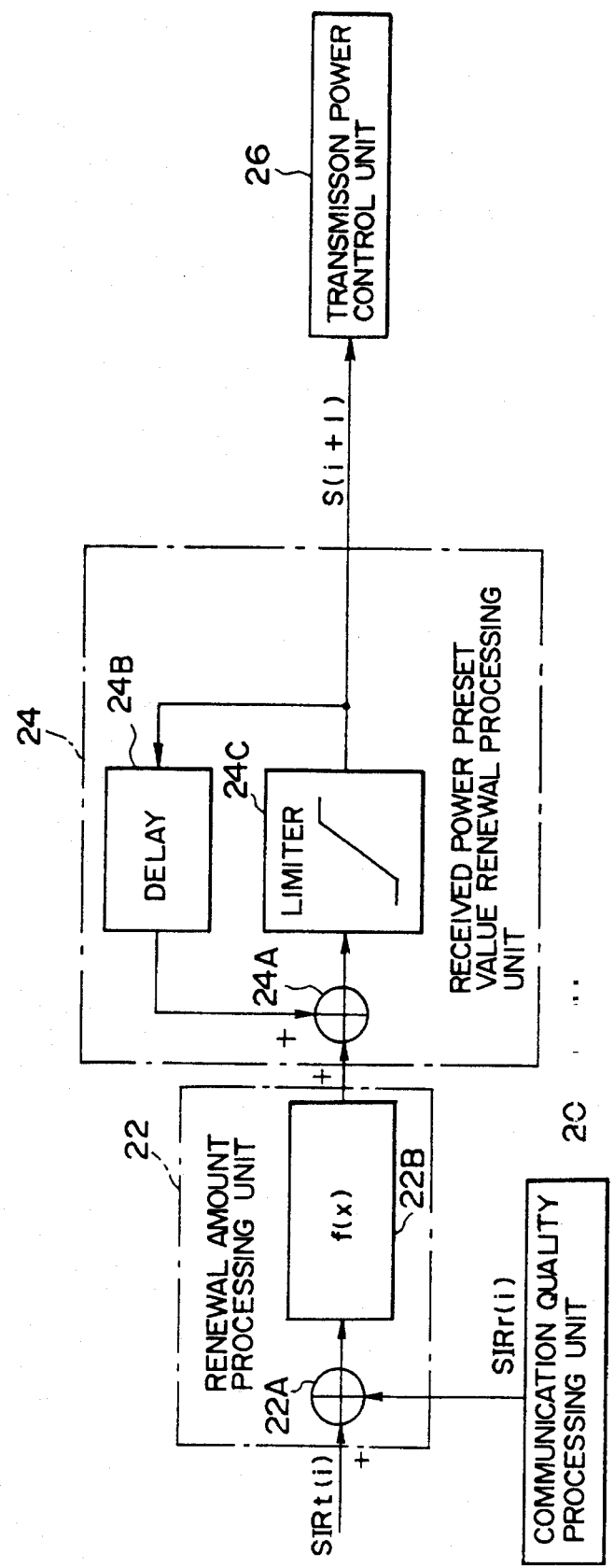
FIG. 2 is a functional block diagram illustrating a principle part of a base station according to the present invention.

FIG. 2 is a functional block diagram of a base station according to the embodiment, in which only constructural elements directly relevant to the present invention are disclosed and those irrelevant to the present invention are not disclosed. A communication quality processing unit 20 calculates SIRr (i), which is a signal to interference power ratio, in each control timing in accordance with a received power preset value of the focused base station and a total received power in the focused base station. The communication quality processing unit 20 outputs the calculated SIRr (i) to an adder 22A of a renewal amount processing unit 22.

The renewal amount processing unit 22 is a processing unit which calculates a renewal amount ΔP in accordance with SIRt (i), which is a target value of SIR, and SIRr (i), and constituted of the adder 22A and a function unit 22B which generate an increasing function f (x) passing an origin of coordinates. The calculated value SIRt–SIRr is transferred from the adder 22A to the function unit 22B and assigned as a parameter to a valuable number x of the function unit 22B so that ΔP=f (SIRt–SIRr) is achieved. The calculated renewal amount ΔP is transferred to an adder 24A of a received power preset value renewal processing unit 24.

The renewal processing unit 24 is constituted of the adder 24A, a delay circuit 24B and a limiter 24C. The renewal processing unit 24 delays a received power preset value S delivered from the limiter 24C through the delay circuit 24B and inputs to the adder 24A. In this way, in accordance with the received power preset value S (i) and the renewal amount ΔP at the previous timing in the base station, the received power preset value S (i) of the base station at the present timing is renewed as to S (i+1)=S (i)+ΔP. Also, the limiter 24C renews the received power preset value S (i+1) of the base station as to either $P_{max}$ or $P_{min}$, respectively, when the renewed received power preset value S (i+1) exceeds the predetermined upper limit value $P_{max}$ or the lower limit value $P_{min}$ of the received power preset value. The renewed received power preset value S (i+1) is then transferred to a transmission power control unit 26.

The transmission power control unit 26 transmits a transmission power control command to mobile stations controlled thereby and controls such that the received power of the base station comes to coincide with the received power preset value S (i+1). Since the present embodiment changes the received power preset value S (i+1) in real time in response to the value of SIR, the cell size of the base station varies. More concretely, as described above, the cell of the base station, in which the number of mobile stations to be connected therewith increases, decreases the size whereas that, in which the number of mobile stations to be connected therewith decreases, increases the size. The present invention as described above increases or decreases the number of mobile stations in a manner that SIRs of each of the base stations become equal with each other, which leads to restrict deviation of communication quality, thereby improving efficiency of the system.

The target value SIRt (i) can be set with an average value of SIRs of the focused base station and its adjacent base stations or with a predetermined value. For example, in the case of presence of a supervisory station under which a plurality of base stations are controlled, the average value can be utilized because the target value SIRt can be flexibly preset, whereas in the case of absence of supervisory station, the predetermined value can be chosen because of self controlled distribution communication.

Figure 3A:
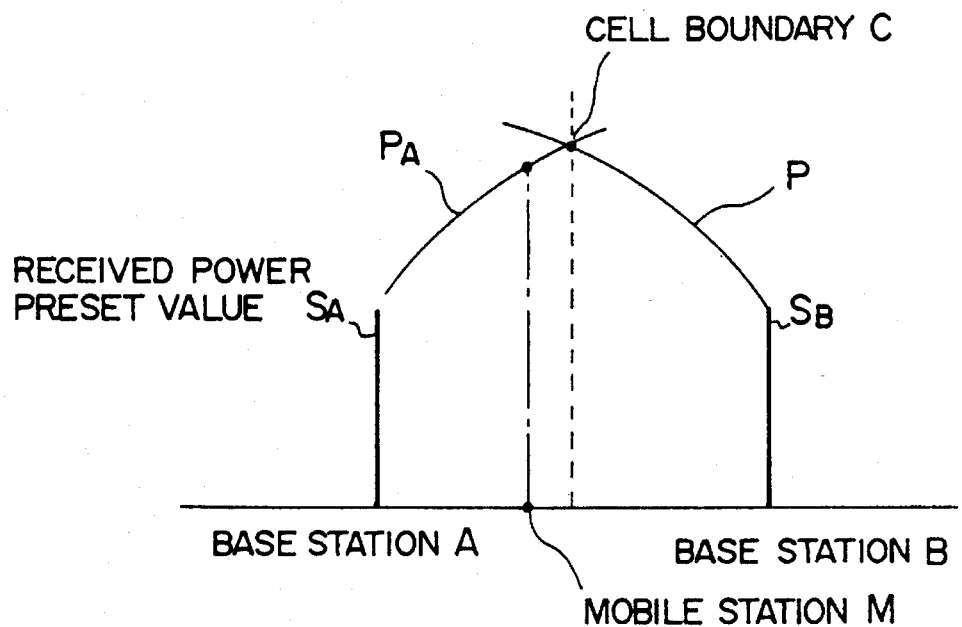
FIGS. 3a and 3b are explanatory views illustrating a cell boundary of a service area between adjacent base stations varying to which an embodiment according to the present invention is applied.

FIG. 3 is an explanatory view illustrating the variation of a cell boundary between adjacent base stations when the received power preset value S varies. As shown in FIG. 3a, when the received power preset value SA of the base station A and the received power preset value SB of the base station B are set to be equal with each other, the power $P_A$ necessary to be transmitted to the base station A by a mobile station M is less than the power PB necessary to be transmitted to the base station B. Accordingly, the mobile station connects a communication route with the base station A to which the transmission power consumes less. However, when the number of mobile stations connected with the base station A increases, SIR in the base station A is degraded so that the received power preset value S of the base station A, as described above, becomes large in accordance with the present embodiment.

Figure 3B:
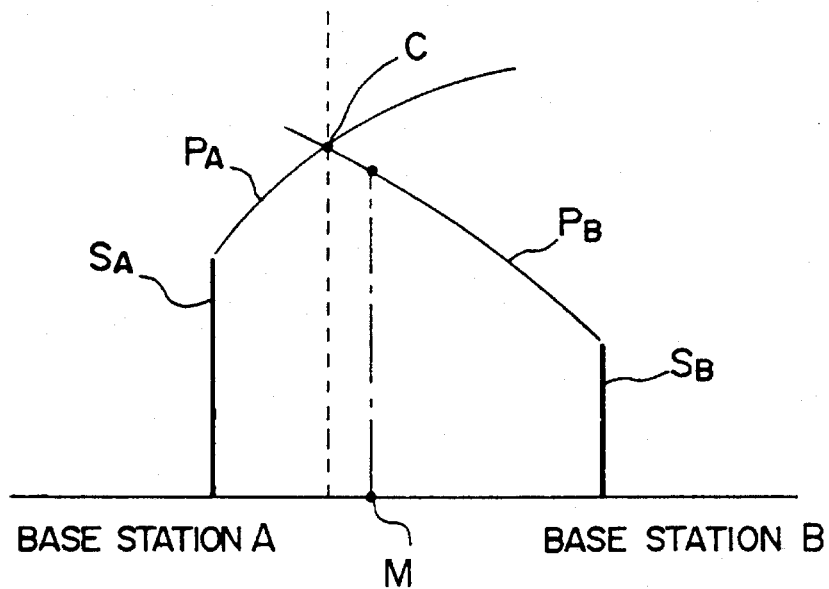

In addition, the fewer the number of mobile stations of the base station B becomes, the better SIR of the base station B becomes so that the received power preset value S becomes small in the base station B. FIG. 3b shows a situation under which the received power preset value S varies in the manner described above. As shown in FIG. 3b, when the received power preset value S of the base station A becomes large, the power necessary to be transmitted by a mobile station becomes large so that the cell size becomes small. When the received power preset value S of the base station B becomes small, the power necessary to be transmitted by a mobile station also becomes small so that the cell size becomes large. As a result, the cell boundary C between the base station A and the base station B shifts to the side of the base station A so that the mobile station M located in the same position as shown in FIG. 3a, transmits less transmission power to the base station B than to the base station A. Accordingly, the connection of the mobile station M shifts from the base station A to the base station B, thereby the mobile station M being supervised by the base station B. As mentioned above, since the received power preset value S varies in response to the value of SIR, a cell size of each base station in the system can flexibly vary.

Figure 4:
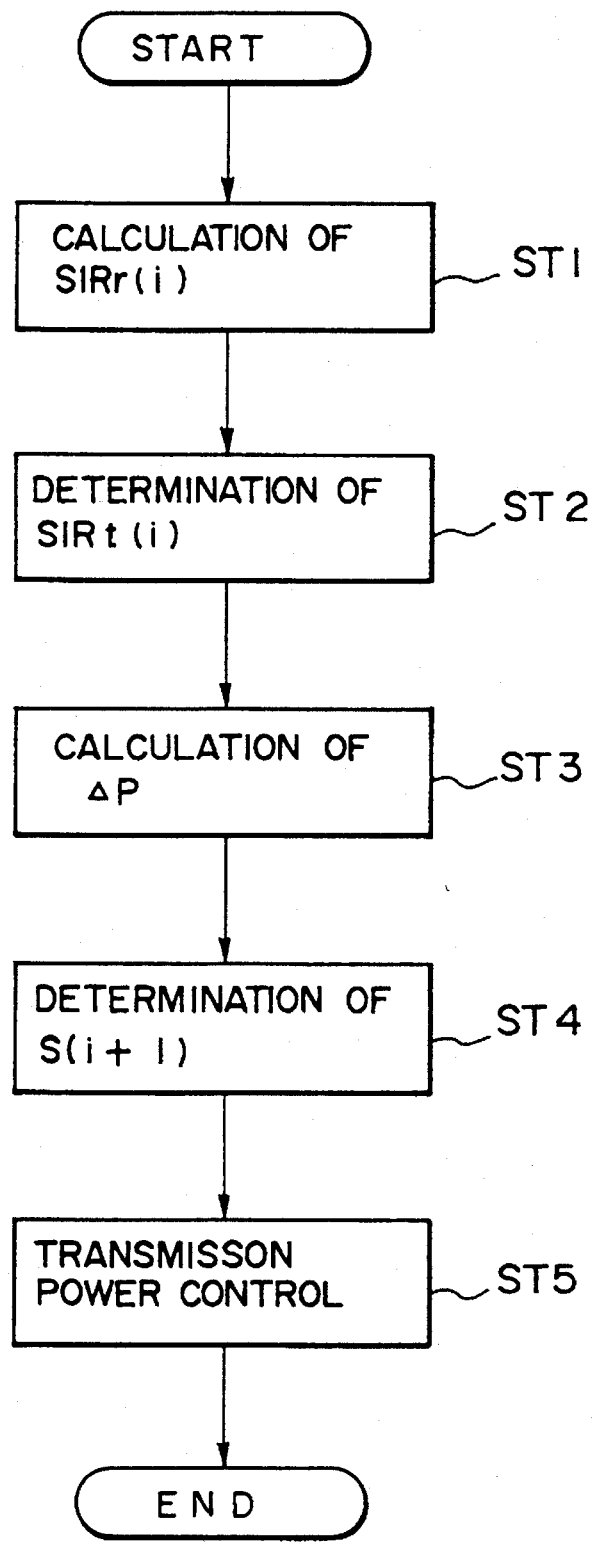
FIG. 4 is a flowchart illustrating an operation of transmission power control according to an embodiment of the present invention.

FIG. 4 is a flowchart illustrating a renewal method for a received power preset value performed in a base station. A transmission power control in accordance with the present embodiment is performed with five processing steps, that is, a communication quality processing step ST1, a target value determination step ST2, a renewal amount processing step ST3, a received power preset value renewal step ST4 and a transmission power control step ST5. The step ST1 is performed in the communication quality processing unit 20, the step ST3 in the renewal amount processing unit 22, the step ST4 in the received power preset value renewal processing unit 24 and the step ST5 in the transmission power control unit 26, respectively, shown in FIG. 2. Further, the step ST2 corresponds to SIRt (i).

A control operation of the transmission power is performed at discrete timings (T=0, 1, 2, i, with a predetermined constant intervals τ. An initial value of the received power predetermined value of all base stations is preset to the lower limit value $P_{min}$ of the predetermined received power preset value.

At each time T=i, SIRr (i) is calculated in the communication quality processing step ST1 in accordance with the received power preset value and the total received power. In the target value determination step ST2, a predetermined value determined in a system designing stage to be used is decided as the target value SIRt (i).

In the renewal amount processing step ST3, the renewal amount ΔP (i) is calculated in accordance with the SIRr (i) and the target value SIRt (i) to satisfy the following formula ΔP (i)=f (SIRt (i)–SIRr (i)). Assuming that an increasing function f (x) passes through the predetermined origin of coordinates. The function f (x) is a function to convert the difference between SIRr and SIRt into a deviation of the received power preset value and can be selected in any form to have an increasing function passing through the origin of coordinates. However, since the function f (x) influences the focusing speed, a linear function with a slope 1 passing through the origin is employed as the most simple increasing function in this embodiment.

In the step ST4, the own received power preset value S (i+1) at the present time is renewed by using the renewal amount ΔP (i) and the own received power preset value S (i) at the just previous control time to satisfy the formula S (i+1)=S(i)+ΔP. Further, when S (i+1) exceeds either the upper limit value $P_{max}$ or the lower limit value $P_{min}$ of the predetermined received power preset value, S (i+1) is replaced by $P_{max}$ or $P_{min}$, respectively.

In the transmission power control step ST5, the control is performed in such a manner that the base station instructs under its supervising mobile stations to transmit with a power under which the received power equals to S (i+1) in accordance with the output S (i+1) of the step ST4. This operation is performed such that the received power of a mobile station is compared with the own received power preset value S (i+1) and when S (i+1) is larger than the received power the base station transmits a command demanding the mobile station to increase a power up to the predetermined value, whereas when S (i+1) is smaller than the received power, the base station transmits a command demanding the mobile station to decrease a power down to the predetermined value.

In this way, when the base station varies its received power the cell size of the base station varies substantially as described above. Since the mobile station is connected with one of the base stations to which the transmission power is least consumed, the cell size varies. Accordingly, when there exists a base station to which the transmission power is less consumed than the base station with which the mobile station is currently connected, the communication will continue by interchanging among base stations similar to the conventional way.

Next, a simulation sample will be described to which the present invention is applied. Simulation conditions sim 1–sim 5 are as follows.

sim 1: the lower limit and the upper limit of the received power preset value are 0 [db] and 10 [db], respectively; and an initial value of the received power preset value of all the base stations is 0 [db].

sim 2: the target value SIRt equals to −15 [db].

sim 3: the function f(x) is a linear increasing function with a slope 1 passing through an origin of coordinates.

sim 4: mobile stations do not move.

sim 5: assuming that a power of electric magnetic wave decreases in inverse proportion to 3.5 powers of a distance.

Figure 5:
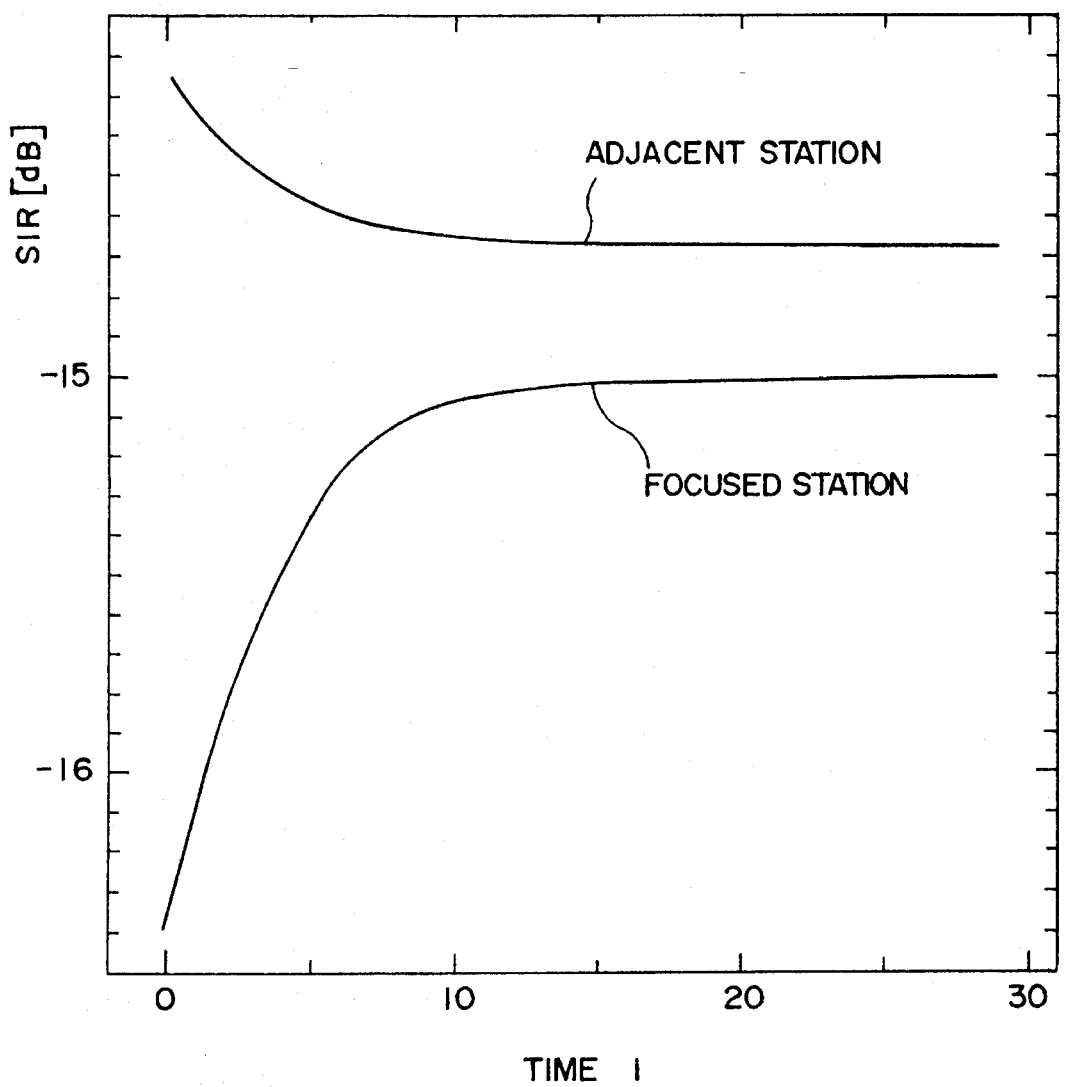
FIG. 5 is a simulation chart illustrating SIR of a base station be focusing to a predetermined value when applied the embodiment according to the present invention.

FIG. 5 illustrates a result of the simulation under the above conditions. The drawing where a horizontal axis represents time i and a vertical axis represents SIR [db], illustrates a transition of SIR of focused and its adjacent base stations. As clearly understood in the FIG. 5, SIRt of the focused base station gradually focuses to the target value SIRt having −15 [db] and SIR of the adjacent base station also focuses to the prescribed value when the present embodiment is applied thereto.

In the simulation described above, since the target value SIRt (i) is selected as the predetermined value determined in the designing stage of the system to be used, a similar advantage can be expected even if the target value SIRt (i) is set to be an average value of the own base station and its adjacent base station as described above. Also, since in the above described simulation the initial value of the received power preset value of all base stations is set to be the lower limit value $P_{min}$ of the predetermined received power preset value, the initial value may be set voluntarily with the value between the lower limit value $P_{min}$ and the upper limit value $P_{max}$ of the predetermined received power preset value.

As explained in detail above, the received power preset value can be varied depending upon SIR at the base station to achieve uniform value of SIR in accordance with the present invention, so that SIR of a base station which has a dense distribution of mobile stations can be improved so as to restrict degradation of efficiency of the system as a whole.

What is claimed is:

1. A base station in a mobile communication system, which is connected and communicated with mobile stations supervised by the base station in a cell zone, the base station comprising:

(a) a communication quality processing unit for calculating a signal to interference power ratio (SIRr) of the base station at each of predetermined intervals of time in accordance with a received power preset value S(i) of the base station and a total received power of the base station derived at each of said predetermined intervals of time;

(b) a renewal amount processing unit for calculating a renewal amount (ΔP) in relation to a formula ΔP=f (SIRt−SIRr)

in accordance with a preset target value (SIRt) and the signal to interference power ratio (SIRr), where f(x) is an increasing function passing through a predetermined origin of coordinates;

(c) a received power preset value renewal processing unit for calculating a renewed received power preset value S(i+1) in relation to a formula S(i+1)=S(i)+ΔP in accordance with the received power preset value S(i) of the base station at a just preceding time and the renewal amount (ΔP); and (d) a transmission power control unit for transmitting a transmission power control command to the mobile stations supervised by the base station so that a received power of the base station comes to coincide with the renewed received power preset value S(i+1).

2. A base station set forth in claim 1, wherein the base station performs communications with the mobile stations in accordance with a code division multiple access (CDMA) communication scheme.

3. A base station set forth in claim 1, wherein the target value (SIRt) is a predetermined value determined at a designing stage of the system.

4. A base station set forth in claim 1, wherein the received power preset value renewal processing unit sets the renewal received power preset value S(i+1) to an upper limit value $P_{max}$ or a lower limit value $P_{min}$ when the value S(i+1) exceeds the upper limit value $P_{max}$ or the lower limit value $P_{min}$ of the received power preset value.

5. A base station set forth in claim 1, wherein the function f(x) is a linear function with a slope 1 passing through the origin of coordinates.

6. A base station set forth in claim 1, wherein the target value (SIRt) is an average value of a signal to interference power ratio between a focused base station and its adjacent base stations.

7. A transmission power control method for a mobile communication system comprising the steps of:

(a) calculating a signal to interference power ratio (SIRr) of a base station at each of predetermined intervals of time in accordance with a received power preset value S(i) of the base station and a total received power of the base station derived at each of said predetermined intervals of time;

(b) calculating a renewal amount ($\Delta P$) in relation to a formula $$\Delta P = f(SIRt - SIRr)$$

in accordance with a preset target value (SIRt) and the signal to interference power ratio (SIRr), where f(x) is an increasing function passing through a predetermined origin of coordinates;

(c) calculating a renewed received power preset value S(i+1) in relation to a formula $$S(i+1) = S(i) + \Delta P$$

in accordance with the received power preset value S(i) of the base station at a just preceding time and the renewal amount ($\Delta P$); and (d) transmitting a transmission power control command to mobile stations supervised by the base station so that a received power of the base station comes to coincide with the renewed received power preset value S(i+1).

8. A transmission power control method set forth in claim 7, wherein the method is applied to the mobile communication system in a code division multiple access (CDMA) communication scheme.

9. A transmission power control method set forth in claim 7, wherein the system performs communications between the base station and the mobile stations in accordance with a code division multiple access (CDMA) communication scheme.

10. A transmission power control method set forth in claim 7, wherein the renewal received power preset value S(i+1) is set to an upper limit value $P_{max}$ or a lower limit value $P_{min}$ when the value S(i+1) exceeds the upper limit value $P_{max}$ or the lower limit value $P_{min}$ of the received power preset value.

11. A transmission power control method set forth in claim 7, wherein the function f(x) is a linear function with a slope 1 passing through the origin of coordinates.

12. A transmission power control method set forth in claim 7, wherein the target value (SIRt) is an average value of a signal to interference power ratio between a focused base station and its adjacent base stations.

* * * * *